United States Patent [19]

Klostermann et al.

[11] Patent Number: 5,219,616

[45] Date of Patent: Jun. 15, 1993

[54] HEAT CURABLE COATING COMPOSITIONS AND THEIR USE FOR COATING FINISH FILMS AND ENDLESS EDGES

[75] Inventors: Peter Klostermann, Sprockhövel; Hans-Dieter Rad, Schwienberdingen; Helmuth Schmaldt, Stuttgart, all of Fed. Rep. of Germany

[73] Assignee: Herberts Geselischaft mit beschranker Haftung, Wuppertal, Fed. Rep. of Germany

[21] Appl. No.: 844,985

[22] Filed: Feb. 28, 1992

Related U.S. Application Data

[63] Continuation of Ser. No. 523,340, May 14, 1990, abandoned.

[30] Foreign Application Priority Data

May 13, 1989 [DE] Fed. Rep. of Germany ....... 3915787

[51] Int. Cl.$^5$ .............................................. B05D 5/00
[52] U.S. Cl. ................................... 427/284; 427/285; 427/391; 427/393; 525/162; 525/443; 525/456
[58] Field of Search ............... 427/284, 285, 391, 393; 525/162, 443, 456

[56] References Cited

U.S. PATENT DOCUMENTS

| | | | |
|---|---|---|---|
| 4,617,223 | 10/1986 | Hiscock et al. | 427/285 X |
| 4,631,320 | 12/1986 | Parekh et al. | 525/456 X |
| 4,752,532 | 6/1988 | Starka | 525/443 X |
| 4,859,743 | 8/1989 | Ambrose et al. | 525/456 X |
| 5,023,141 | 6/1991 | Willey | 525/443 X |

*Primary Examiner*—Michael Lusigan
*Attorney, Agent, or Firm*—Schweitzer Cornman & Gross

[57] ABSTRACT

This invention relates to a process of coating a finish film and one endless edge which comprising applying to said film and edge a heat curable coating composition containing an organic solvent, a lacquer additive and (a) from about 40 to about 85 parts by weight of an acetal and hydroxy functional resin; (b) from about 3 to about 20 parts by weight of an aminoplast resin; and (c) from about 0 to about 40 parts by weight of a polyester resin; and curing the wet film at a temperature between about 120 degrees C., to about 200 degrees C.

5 Claims, No Drawings

HEAT CURABLE COATING COMPOSITIONS AND THEIR USE FOR COATING FINISH FILMS AND ENDLESS EDGES

This is a continuing application of U.S. Ser. No. 523,340, filed on May 14, 1990, now abandoned.

FIELD OF THE INVENTION

The invention relates to heat-curable coating compositions, which contain organic solvents and conventional lacquer additives and are suitable particularly for coating finish films and endless edges.

BACKGROUND OF THE INVENTION

In the furniture industry and in the panel-making industry, surface finishing by means of impregnated papers have long been known. These are pressed onto particle boards or wood fiber hardboard and represent a filler or primer (priming film) or frequently also have a decorative effect (finish or also decorative film). The inadequate supply of wood tone veneers and their high price level, as well as the attitude of customers towards replacing more frequently moderately priced furniture and the demand for special optical surface effects have all contributed to a heavy use of these types of films. In order to meet the standardized requirements, of e.g. German Standard DIN 68861, Group A, with regard to surface optical properties and the resistances, these films are usually given a subsequent coating.

To simplify the overall course of the production, the impregnated and, if necessary printed papers are provided directly with a coating by the film manufacturer and supplied as so-called finish films to the furniture and panel industries.

The coating of finish films as well as of endless edges is carried out in special machines. Either raster rollers or wire doctor blades are used as lacquer applicator and metering equipment. The amount of lacquer applied usually is between 5 and 60 g/m$^2$ and the thickness of the wet film is between 10 and 80 microns. Drying tunnels, in which the air is heated (convectors), as well as IR radiators are used to dry the lacquer. After the coating is cured the finished film is fabricated as a roll and supplied in this form to the customers in the furniture and panel industries.

This finish film, supplied as roll goods, is glued together under pressure and heat with the substrate (particle board or hardboard). The surfaces, so obtained, require no further final treatment.

It is important that the films, which have been lacquered but not yet pressed, are largely dimensionally stable, that is, they must not curl or bend which are referred to among experts as "dishing".

Temperatures of the order of 150° C. to 180° C. and an elevated pressure are usually employed for 5 to 30 seconds for pressing on finish films and endless edges to manufacture panels or furniture. The completed finish films and endless edges should not tend to block or to discolor. During the pressing process, as well as already while preparing the finish films and endless edges, the formation of formaldehyde and its emission should be avoided as far as possible or at least greatly reduced.

As a result of this procedure, the finish films as well as the endless edges should comply with special requirements, since not only the properties of the final coating, but also resistance to the mechanical stresses and temperature effects, which occur during the pressing process, must be ensured.

Also, after the film is pressed onto the panels and furniture parts, the surfaces obtained must have a high scratch resistance and be resistant to the conditions encountered in the household, as provided for e.g. by German Standard DIN 68861, Group A. According to this Standard, the tests are carried out with materials encountered in the home, such as acids, namely acetic and citric acids, alkalies, such as sodium carbonate and a solution of ammonia in water, alcohols, such as ethanol, various beverages, black tea, solvents, such as gasoline and acetone, fats, such as butter and olive oil, salts, mustard, disinfectants, ball point pastes, stamp ink and scouring and cleaning materials. According to the Standard DIN 68861, Part A, the surfaces, have to withstand the action of such materials for 16 hours without visible changes.

For surfaces that are to have good resistance to conditions encountered in the home and to being scratched, attempts were made in the prior art to use lacquers, which contain alkyd resins in combination either with melamine and/or urea resin as the principal vehicle.

However, the these lacquers, formulated with significant portions of urea and/or melamine resins, exhibit appreciable disadvantages when acted upon by chemicals and particularly by water and aqueous solutions, because the surface is attacked and thus no longer satisfies the requirements with respect to surface optics and resistance of the cited Standard. Moreover, due to the reaction of the vehicle components during the curing of the lacquer film, formaldehyde is emitted already during the processing of the materials. However, this emission is not finished after the processing and can continue for a long time. Appreciable amounts of formaldehyde can emerge from the lacquer, in spite of the relatively small amount of lacquer, compared to the finished, pressed particle board.

After thermal curing of the lacquer, the films, produced with the known formulations, show a strong tendency to dish and thus have problems, on the one hand, when the film is fabricated and, on the other hand, when the film is pressed. The surfaces, so produced, cannot be painted over with the existing system, so that repairs are not possible.

Lacquers suitable for coating finish films and endless edges are disclosed, for example, in German accepted patent application No. 36 10 732. These aqueous systems are based on polyacrylate resins with self cross-linking acid amide derivatives in combination with melamine resins or melamine/urea resin mixtures and blocked acids as potential curing catalysts. Such aqueous lacquers are, however, have problems with respect to wetting the substrate and also tend to form while being processed.

BRIEF DESCRIPTION OF THE INVENTION

It is therefore an object of the invention to make available heat-curable coating compositions, which are suitable for coating finish films and endless edges, result in good wetting of the substrate, show no foaming tendencies while being processed, do not cause any dishing of the films when applied, split off only slight amounts of formaldehyde during and after the curing and lead to coatings, which are mechanically and chemically resistant, have no tendency to block and suffer no harmful changes during a heat treatment in the press.

A heat-curable coating composition containing an organic solvent, a lacquer additive and, as vehicle, a mixture of:

A) from about 40 to about 85 parts by weight of an acetal-functional and hydroxyl-functional precondensate of a hydroxy-functional resin with a hydroxy functionality of at least 3 OH groups per molecule and a number average molecular weight of from about 300 to about 10,000, and an acetal with from about 2 to about 10 acetalalkoxy end groups and a number average molecular weight of from about 90 to about 1,000, the precondensate having a viscosity of from about 200 to about 50,000, mPa x sec, measured on an about 60% solution in methoxypropyl acetate at about 25° C.;

B) from about 3 to about 20 parts by weight of an aminoplast resin; and

C) from about 0 to about 40 parts by weight of a polyester resin having a number average molecular weight of from about 500 to about 5,000.

The parts by weight given are based on the solids portion of the vehicle components used.

DETAILED DESCRIPTION OF THE INVENTION

A component A), the heat-curable coating composition of the invention contain acetal-functional and hydroxy-functional precondensates. The acetal-functional and hydroxy-functional precondensates are used in amounts of from about 40 to about 85% by weight and preferably of from about 50 to about 70% by weight, based on the total vehicle as solid resin being 100% by weight. Suitable are acetal-functional and hydroxy-functional precondensate, which are prepared, for example, by the partial reaction of hydroxyl-functional base resins with acetals.

Examples of such precondensates are disclosed in German accepted patent application No. 3,339,424.

As base resins, those hydroxyl group-containing compounds, with a hydroxyl functionality of at least 3 and a number average molecular weight of from about 300 to about 10,000, come into consideration.

Examples of such hydroxyl group-containing compounds are polyacrylate resins and polycondensation resins, such as polyesters or alkyl resins, and polyaddition resins, such as polyurethane resins.

Examples of polyacrylate resins with a number average molecular weight of up to about 10,000 are disclosed in the patent literature, for example, in German accepted patent applications Nos. 1,595,243; 2,054,231; 2,021,178; and 2,603,259. These resins are, for example, polymers of acrylic monomers such as (meth)acrylic acid, methyl (meth)acrylate, hydroxymethyl (meth)acrylate, and vinyl compounds, such as those described in the book by Wagner/Sarx: Lackkunstharze (Synthetic Lacquer Resins), 5th edition, Chapter 4, pages 229 to 238.

As polycondensation resins, polyester resins and alkyd resins, for example, come into consideration. Polyester resins are the reaction products of aliphatic, cycloaliphatic and/or aromatic monocarboxylic acids and/or polycarboxylic acids with aliphatic and/or cycloaliphatic monools and/or polyols. Especially preferred are polyesters or alkyd resins with a number average molecular weight of from about 300 to about 5,000, which contain, as carboxylic acid components, compounds such as adipic acid, benzoic acid, p-tert.-butylbenzoic acid, maleic acid, fumaric acid, o-, m-, p-phthalic acid, sebacic acid, tetrahydrophthalic acid, hexahydrophthalic acid, trimellitic acid, as well as aliphatic saturated and/or unsaturated monocarboxylic acids with from about 6 to about 20 carbon atoms and, as alcohol component, compounds such as ethylene glycol, propylene glycol, glycerin, pentaerythritol, neopentyl glycol, trimethylolethane, trimethylolpropane, hexanediol, neopentyl glycol hydroxypivalate, diethylene glycol and/or dipropylene glycol. Such polyesters or alkyd resins are described, for example, in the book by Houben-Weyl: Makromolekulare Stoffe (Macromolecular Materials) II, vol 14/2, pages 4 to 42, and in the book by Ullmann, "Enclycopaedie der technischen Chemie" (Encyclopedia of Industrial Chemistry) 4th edition, vol. 19, pages 61 to 86.

As polyaddition resins, advisably with a number average molecular weight of from about 300 to about 5,000, those are used which are synthesized from hydroxyl group-containing polyester and/or polyols with difunctional and/or trifunctional isocyanate resins by a polyaddition reaction. Small amounts of primary or secondary amines can also be used as substances with an active hydrogen and the resulting reaction products once again carry hydroxyl groups. Especially preferred are those polyaddition resins, which have a hydroxyl number of from about 50 to about 500.

These base resins are partially reacted with acetals. The acetals are reaction products of aldehyde with a molecular weight of at most 500 and monoalcohols and optionally polyalcohols and have, on the average from about 2 to about 10 acetalalkoxy end groups and an average molecular weight of from about 90 to about 1,000. The reaction takes place, for example, in organic solvents at temperatures of 100° C. to 200° C. in the presence of catalysts such as Lewis acids and protonic acids, which are customarily used for transacetalization reactions.

Examples of acetal components are acetals of the formula:

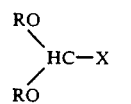

and/or

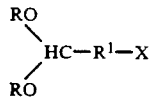

wherein

R is a branched or straight chain $C_{1-C_4}$ alkyl moiety;

$R^1$ is a branched or straight chain $C_{1-C_{15}}$ alkylene phenylene, or diphenylene ether moiety;

X is a branched or straight chain $C_{1-C_4}$ alkyl, $RO-CH_2-$, or $(RO)_2CH-$ moiety, in which R is the same as defined above, such as 1,1,2,2-tetramethoxyethane, 1,1,2,2-tetraethoxyethane, 1,1,3,3-tetramethoxypropane, 1,1,3,3-tetraethoxypropane, 1,1,2-trimethoxyethane, 2-ethyl-1,1-dimethoxyhexane, 1,1-dimethoxy-3,5,5-trimethylhexane, 4,4'-bis(dimethoxymethyl)diphenyl ether.

For the precondensation, the use of equivalent amounts of the two multifunctional components and partial condensation under conditions of acid catalysts up to a suitable viscosity stage has proven to be advantageous.

A suitable viscosity is from about 200 to about 50,000 mPa x sec, measure as about a 60% solution in methoxypropyl acetate at 25° C.

Suitable acid catalysts are conventional acid catalysts, for example, those based on sulfonic acids, such as p-toluenesulfonic acid, dodecylbenzenesulfonic acid and dinonylnaphthalenedisulfonic acid, phosphoric acid, phosphonic acids, sulfuric acid or hydrochloric acid.

For the partial reaction, the hydroxy-functional component and the acetal component are used in the ratio of the number of OH groups to the number of acetalalkoxy groups of 3:1 to 0.7:1 and preferably of 1:1. The reaction is carried out with heating until the desired viscosity is reached. In general, the reaction is conducted at a temperature above the boiling point of the alcohol that is to be split off. When the desired viscosity is reached, the reaction can be stopped by cooling the precondensate solution. After the acid catalyst is neutralized with, for example, an amine such as a tertiary amine, solutions with a long shelf life are obtained. The solvents, which come into consideration for this reaction, must be largely resistant to saponification under the reaction conditions and have a boiling point that is clearly higher than that of the alcohol that is to be split off. Such solvents are ethers and ether ester, such as methoxypropyl acetate. The method is explained in greater detail in the following example.

The hydroxyl-functional base resin used is a polyester with a calculated molecular weight of $\overline{M}_n = 1200$ and a hydroxyl functionality of 6. The acetalization is carried out with a mixture of the acetals, 1,1,3,3-tetramethoxypropane and 1,1,2-trimethoxyethane in a molar ratio of 3:1, catalyzed with p-toluenesolfonic acid (0.1 mole percent p-toluenesulfonic acid based on the acetal). The equivalence ratio of hydroxyl groups to acetalmethoxy groups is 1:1. The polyester resin, dissolved in methoxypropyl acetate, together with the p-toluenesulfonic acid is transferred to the reactor and the acetal mixture is added with stirring. The condensation commences at a reaction temperature of 100° C. to 110° C. To check the process, the amount of condensed methanol is measured and the viscosity of the reaction mixture is determined again at short intervals. In the example named, the desired precondensation viscosity of 1,400 mPa x sec (measured on a 60% solution in methoxypropyl acetate at 25° C.) is reached after 13.6% of the maximum amount of methanol possible has been split off. When this viscosity value is reached, the reaction can be stopped by cooling the precondensate solution. After the acid catalyst is neutralized with a tertiary mine, resin solutions with a long shelf lift are obtained.

As component B), the inventive, heat-curable coating compositions contain 3 to 20% by weight (based on the total vehicle as solid resin being 100%) of an aminoplast resin. As aminoplast resins, condensation products can be considered, similar to those obtained according to the known method by the reaction of formaldehyde with urea, benzoguanamine or melamine. They are usually still totally or partially etherified with alcohols having 1 to 6 carbon atoms. In this connection, it is a question of cross linkers, which are conventionally used in the lacquer sector.

Preferred are condensation products of formaldehyde and melamine, etherified completely or partially with methanol. Hexamethoxymethylmelamine resins, such as CYMEL 303 (CYMEL is a registered trademark), which is obtainable as a commercial product, have proven to be particularly suitable.

Such condensates are described, for example, in the book by Ullmann, "Encyclopedia of Industrial Chemistry", 5th edition, volume A 2, in the chapter entitled "Aminoresins", page 115 to 141 (1985) and in the book by Houben-Weyl, "Methoden der Organischen Chemie" (Methods of Organic Chemistry), volume 14/2, pages 319 to 388 (1963).

The inventive, heat-curable coating compositions contain solvents and conventional lacquer additives.

As organic solvent for the vehicle, conventional lacquer solvents are used, namely alcohols such as isopropanol, n-butanol, aromatic hydrocarbons such as xylene, trimethylbenzene, a mixture of aromatic hydrocarbones sold by Esso Chemical under the trade name designation Solvesso 100, ether esters such as methoxypropyl acetate, ethers such as ethylene glycol dimethyl ether or other organic solvents, which are able to dissolve the vehicle. It is also possible to use mixtures of solvents.

As lacquer additives, the inventive coating compositions contain acid catalyst conventionally employed for the curing of aminoplast resins, such as those based on sulfuric acid, sulfonic acids (for example, p-toluenesulfonic acid, dodecylbenzenesulfonic acid, dinonylnaphthalenesulfonic acid), phosphoric acid, phosphonic acids or hydrochloric acid, as well as blocked acids (adducts, for example salts, which split off free acids at the lacquer curing temperature) and Lewis acids. The acid catalysts are added shortly before the administration. The acids are added in the usual catalytic amounts, such as from about 0.1 to about 5% by weight, based on the total coating composition.

The coating composition may, moreover, contain further conventional additives, such as silicone oils, low molecular weight acrylate polymers (levelling agents), oxidized polyethylene waxes, polysiloxane defoamers, optionally wetting agents and dulling agents (silicic acid derivatives, waxes).

The inventive heat-curable coating composition contains preferably about from about 40 to about 100 parts by weight of solvent and additives per 100 parts of vehicle. The amount of solvent depends largely on the application conditions. Systems with a low solvent content are preferred.

The heat-curable coating composition, which is defined in the claims, may, moreover, contain up to about 40% by weight of a polyester resin. Polyester resins or alkyd resins are reaction products of aliphatic, cycloaliphatic and/or aromatic monocarboxylic acids and/or polycarboxylic acids with aliphatic and/or cycloaliphatic monools and/or polyols. Especially preferred are polyesters or alkyd resins with a number average molecular weight of from about 500 to about 5,000, which contain, as carboxylic acid component, compounds such as adipic acid, benzoic acid, p-tert.-benzylbenzoic acid, maleic acid, fumaric acid, o-, m- or p-phthalic acid, sebacic acid, tetrahydrophthalic acid, hexahydrophthalic acid, trimellitic acid as well as aliphatic saturated and/or unsaturated monocarboxylic acids with 6 to 20 carbon atoms and, as alcohols components, compounds such as ethylene glycol, diethylene glycol, propylene glycol, glycerin, pentaerythritol, neopentyl glycol, trimethylolpropane, butanediol, pentanediol, hexanediol, neopentylglycol hydroxpivalate and/or dipropylene glycol. Such polyesters or alkyd resins are described for example, in the book by Houben-Weyl "Methoden der Organischen Chemie", Makromolekulare Stoffe ("Methods of Organic Chemistry", Macromolecular Materials) II, volume 14/2, pages 4 to 42, and in the book by Ullmann "Encyklopaedie der technischen Chemie" (Encyclopedia of Industrial Chemistry), 4th edition, volume 19, pages 61 to 68.

The inventive coating agents can be applied in a single-coat method, for example, with the help of a doctor blade, by casting or by means of a roller, on different substrates and cured by a heat temperature up to a temperature of, for example 200° C. preferably at 140° to 160° C.

The are particularly suitable to be used for lacquering finish films and endless edges. These may consist, for example, of resin-impregnated paper.

The inventive coating agents have the advantage that they split off only small amounts of formaldehyde while being cured, yellow only slightly during the curing process as well as in response to environmental influences and lead to coatings with good mechanical and chemical resistance, particularly with a high water resistance and, with that, to lacquered films with a low tendency to dish.

After a heat treatment at 140° C. to 160° C., they are cured already to such an extent that they withstand without being damaged the pressing conditions employed in the manufacture of panels and furniture parts without showing block properties and discolorations. The surfaces, so obtained, have a high scratch resistance and attain the resistance values required in the German Standard DIN 68861, Group A. They emit little formaldehyde during the coating of the films and endless edges, as well as during the further processing of the coated films and endless edges.

The invention is further illustrated by the following examples. Any parts by weight and percentages by weight are based on the solids content of the material.

EXAMPLE 1

1) Preparation of a Polyester as a Hydroxyl Group-Containing Base Resin

Trimethylolpropane (500 g) was mixed with 340 g of phthalic anhydride, 169 g of adipic acid and 111 g of isopelargonic acid in a 4-neck flask, which was equipped with a column, separator, condenser, stirrer and inert gas inlet. A little xylene was added an entraining agent and the temperature was raised initially to 150° C. Subsequently, the reaction temperature was increased (up to a maximum of 210° C.) and water was removed azeotropically from the reaction mixture, until the acid number of the resulting resin was less than 2 mg KOH/g. The resin formed was cooled and diluted with methoxypropyl acetate to form a 60% solution.

2) Acetalization of the Hydroxy-Functional Base Resin Described Under 1)

The base resin solution of 1) (1,000 g) is mixed with 0.17 g of p-toluenesulfonic acid and heated for 30 minutes at 60° C. in a 4-neck flask, which is provided with a column, stirrer, inert gas inlet and separator and separator. After that, 139,3 g of 1,1,3,3-tetramethoxypropane and 33.7 g of 1,1,2-trimethoxyethane are added and the temperature is slowly raised to 100° C. At this temperature, the methanol is split off and distilled over. When the desired viscosity of 1,400 mPa x sec is reached, the temperature is lowered rapidly and 0.22 g of triethylamine are added for neutralization. The clear resin solution obtained has a nonvolatiles content of about 65% by weight.

EXAMPLE 2

Coating composition

The acetal-functional and hydroxyl-functional precondensate (70 parts), prepared as was the example of the vehicle component A) and having a stoving residue (1 hour at 120° C.) of 65% by weight, is mixed with 10 parts of a (hexamethoxymethylmelamine resin with a baking residue after 1 hour at 120° C. of 95% and sold under the trade designation CYMEL 303. To this mixture are added with constant stirring 2% by weight of an emulsion containing an oxidized polyethylene was, 5% by weight of finely dispersed silica as a dulling agent and 1% by weight of a defoamer containing a polysilocane. As solvent, 5% by weight of n-butanol and 7% by weight of xylene are added. After the addition of 4% by weight of a catalyst solution consisting of 20 parts of p-toluenesulfonic acid monohydrate and 80 parts of n-butanol and adjusting to the processing viscosity the coating was applied in 20 to 50 micron thickness a wet film. The coat was then cured at 140° C. to 160° C. within 30 to 60 seconds. The curing is so complete, that the coating withstands without harmful effects the further steps of the method, particularly the increasingly used more sever pressing conditions, without block properties or discolorations. The following resistances according to the German Standard DIN 68861, Group A, were attained by the cured coating.

| Test Agent | Duration of Action of the Test Agent | Result |
| --- | --- | --- |
| 1. Water | 16 hours | 0 |
| 2. Aqueous Ammonia | 16 hours | 0 |
| 3. Ethanol | 16 hours | 0 |
| 4. Mustard | 16 hours | 0–1 |
| 5. Acetone | 16 hours | 1 |

The result is rated by comparing the tested and untested area according to the following subjective scale (similarly to the German Standard DIN 53230):

0 No visible changes
1 Barely recognizable changes in gloss or color
2 Slightly recognizable changes in gloss or color. The structure of the test surface is not changed
3 Strong markings visible; the structure of the test surface is, however, largely undamaged
4 Severe markings visible; the structure of the test surface is changed
5 Test surface is greatly changed or destroyed.

The cured coating, obtained from the inventive coating composition, was subjected to a formaldehyde emission test. The results were compared with those obtained from a conventional "SH" lacquer from the state of the art.

Formaldehyde was determined by gas analysis, using a method based on the German Standard DIN 52368. The values indicate the mg of formaldehyde of support material. The results are given for two thicknesses of wet film.

| Wet Film Thickness | Inventive Coating Composition Period of Time | Formaldehyde Emission |
| --- | --- | --- |
| 36 microns | 2–4 hours | 0.24 mg |

-continued

| Wet Film Thickness | Inventive Coating Composition Period of Time | Formaldehyde Emission |
| --- | --- | --- |
| 50 microns | 2-4 hours | 0.34 mg |

The formaldehyde emission over 2-4 hours of presently used heat-curable lacquers, which are 36 microns thick, is 0.85 mg.

We claim:

1. A process for coating a finish film and one endless edge which comprises applying to said film and edge a heat-curable coating composition containing an organic solvent, a lacquer additive and, as vehicle, a mixture of (a) from about 40 to about 85 parts by weight of an acetal-functional and hydroxyl-functional precondensate of a polyacrylate or polyester resin with a hydroxy functionality of at least 3 OH groups per molecule and a number average molecular weight of from about 300 to about 10,000 and an acetal with from about 2 to about 10 acetalalkoxy end groups and a number average molecular weight of from about 90 to about 1,000, the precondensate having a viscosity of from about 200 to about 50,000 mPa x sec, measured on an about 60% solution in methoxypropyl acetate at about 25° C.; (b) from about 3 to about 20 parts by weight of an aminoplast resin; and (c) from about 0 to about 40 parts by weight of a polyester resin having a number average molecular weight of from about 500 to about 5,000; and curing the wet film at a temperature between about 120° C. and about 200° C.

2. The method of claim 1, wherein the wet film is cured at from about 140° C. to about 160° C.

3. The process of claim 1, wherein in the composition the acetal-functional and hydroxy-functional precondensate was obtained by the partial reaction of the film-forming, hydroxy-functional resin with acetals of the formula

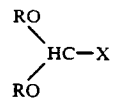

and/or

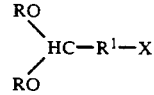

wherein
R is a branched or straight chain $C_1$-$C_4$ alkyl moiety;
$R^1$ is a branched or strain chain $C_1$-$C_{15}$ alkylene, phenylene or diphenylene ether moiety; and
X is a branched or straight chain $C_1$-$C_4$ alkyl, $RO-CH_2-$, $(RO)_2CH-$ moiety, in which R is the same as defined above.

4. The process of claim 3, wherein the aminoplast resin (b) is a totally or partially etherified melamine formaldehyde condensation resin.

5. The process of claim 4, wherein said etherified melamine formaldehyde condensation resin was totally or partially etherified with methanol.

* * * * *